United States Patent
Shumozaki

(10) Patent No.: US 9,080,628 B2
(45) Date of Patent: Jul. 14, 2015

(54) ROTARY DAMPER DEVICE AND METHOD FOR PRODUCING SAME

(75) Inventor: Kei Shumozaki, Yokohama (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/002,554

(22) PCT Filed: Jan. 10, 2012

(86) PCT No.: PCT/JP2012/000079
§ 371 (c)(1),
(2), (4) Date: Sep. 5, 2013

(87) PCT Pub. No.: WO2012/117654
PCT Pub. Date: Sep. 7, 2012

(65) Prior Publication Data
US 2014/0001007 A1     Jan. 2, 2014

(30) Foreign Application Priority Data

Mar. 2, 2011   (JP) ................................. 2011-045380

(51) Int. Cl.
| F16D 57/02 | (2006.01) |
| F16F 9/14 | (2006.01) |
| F16D 41/18 | (2006.01) |
| F16D 41/06 | (2006.01) |

(52) U.S. Cl.
CPC ............... *F16F 9/145* (2013.01); *F16D 41/06* (2013.01); *F16D 41/18* (2013.01)

(58) Field of Classification Search
USPC .......................... 188/290, 292, 296, 307, 293
See application file for complete search history.

(56) References Cited

U.S. PATENT DOCUMENTS

| 7,214,161 | B2 | 5/2007 | Jinbo | |
| 8,177,042 | B2 * | 5/2012 | Okabayashi et al. | ......... 188/293 |
| 8,689,952 | B2 * | 4/2014 | Sato | ............................... 188/307 |
| 2008/0302619 | A1 * | 12/2008 | Cultraro | ........................ 188/291 |
| 2014/0083809 | A1 * | 3/2014 | Shimozaki, Kei | .............. 192/46 |
| 2014/0284155 | A1 * | 9/2014 | Zhang et al. | .................. 188/292 |

FOREIGN PATENT DOCUMENTS

| CN | 1629512 A | 6/2005 |
| CN | 1853054 A | 10/2006 |

(Continued)

OTHER PUBLICATIONS

China Patent Office, "Office Action for CN 201280018750.0" Dec. 3, 2014.

*Primary Examiner* — Christopher Schwartz
(74) *Attorney, Agent, or Firm* — Manabu Kanesaka

(57) ABSTRACT

A rotary damper device includes a damper housing enclosing a viscous fluid; a rotor having a rotor vane rotatably received inside the damper housing, and a rotor axis protruding to an outside of the damper housing; and a rotary member combined with a protruding end of the rotor axis. The rotary member includes an insertion hole through which the protruding end of the rotor axis passes, and a pair of control walls at a hole edge with the insertion hole interposed therebetween. A protruding end of the rotor axis protrudes in a radial direction of the rotor axis along a gap between the pair of control walls so as to be engaged with the hole edge of the insertion hole by being heated and deformed in a state wherein the protruding end of the rotor axis has passed through the insertion hole.

8 Claims, 7 Drawing Sheets

(56) References Cited

FOREIGN PATENT DOCUMENTS

| JP | H08-247256 A | 9/1996 |
| JP | 2003-139184 A | 5/2003 |
| JP | 2007-139083 A | 6/2007 |
| JP | 2008-163667 A | 7/2008 |
| JP | 2008-240854 A | 10/2008 |
| JP | 2009-197836 A | 9/2009 |
| JP | 2009-280171 A | 12/2009 |

* cited by examiner

ROTARY DAMPER DEVICE AND METHOD FOR PRODUCING SAME

RELATED APPLICATIONS

The present application is National Phase of International Application No. PCT/JP2012/000079 filed Jan. 10, 2012, and claims priority from Japanese Application No. 2011-045380, filed Mar. 2, 2011.

FIELD OF TECHNOLOGY

The present invention relates to a rotary damper device damping a rotation of a rotary member such as a gear and the like, and a method for manufacturing the same.

BACKGROUND ART

Conventionally, there is one using a rotary damper with an object for slowly activating a door and the like urged in one side of an open direction or a closing direction. The rotary damper comprises a damper housing internally enclosing a viscous fluid; and a rotor including a rotor vane received in the damper housing, and a rotor axis provided to project in the rotor vane and protruding from the damper housing. The rotary damper is combined with the rotary member such as the gear and the like to damp the rotation in the rotor axis. Such rotary damper is sometimes used in combination with a one-way clutch to generate a damping force relative to only a unidirectional rotation (for example, Patent Document 1).

PRIOR ART DOCUMENT

Patent Document

Patent Document 1: Japanese Unexamined Patent Application Publication No. 2008-163667

DISCLOSURE OF THE INVENTION

Problems to be Solved by the Invention

In the invention described in the Patent Document 1, a key portion is formed in an end of the rotor axis, and a key hole is formed on a one-way clutch side. By fitting the key portion into the key hole, the rotor axis and the one-way clutch are combined to be integrally rotatable. However, the invention described in the Patent Document 1 does not include a device controlling the rotor axis and the one-way clutch in an axis line direction of the rotor axis, so that there is a problem that the rotor axis and the one-way clutch are separated.

The present invention is made in view of the aforementioned problem, and an object of the present invention is to simplify and ensure a combination structure between the rotor axis and the rotary member combined with the rotor axis in the rotary damper.

Means for Solving the Problems

In order to obtain the aforementioned object, the present invention is a rotary damper device (1) comprising a damper housing (11) internally enclosing a viscous fluid; a rotor (12) including a rotor vane (28) rotatably received inside the damper housing, and a rotor axis (29) provided to project along a rotary axis of the rotor vane, and protruding to an outside of the damper housing; and a rotary member (3) combined with a protruding end of the rotor axis. The rotary member includes an insertion hole (43) through which the protruding end of the rotor axis passes; and a pair of control walls (44) provided to stand in a hole edge on a side facing the damper housing side of the insertion hole in such a way as to be mutually opposed by sandwiching the insertion hole. The protruding end of the rotor axis is heated and deformed in a state wherein the protruding end of the rotor axis has passed through the insertion hole, and protrudes in a radial direction of the rotor axis along a gap between the pair of control walls so as to be engaged with the hole edge of the insertion hole.

According to the configuration, when the protruding end of the rotor axis is engaged with the hole edge of the insertion hole by being heated and deformed, the pair of control walls controls a deformation direction of the protruding end of the rotor axis, so that an engagement formation between the protruding end of the rotor axis and the hole edge of the insertion hole is easily carried out. Also, instead of making the deformation (protrusion) direction all-round in the radial direction, by limiting the deformation direction to a direction of one portion, the protruding end of the rotor axis engaging with the hole edge of the insertion hole can be made thick so as to enhance rigidity of an engagement structure. Also, the protruding end of the rotor axis which has been heated and deformed can also engage with the control wall, so that the control wall can be integrally rotated with the rotor axis.

In another aspect of the present invention, the rotary member (3) includes a cylindrical outer member (36) including an internal gear (63); an inner member (35) received in the outer member concentrically and rotatably, and including two concave portions (47) in an outer circumferential portion; and planetary gears (37) rotatably received in the respective concave portions, and engaged with the internal gear. When the outer member rotates in a positive direction relative to the inner member, the planetary gear rotates inside the concave portion, and the outer member rotates independently from the inner member. On the other hand, when the outer member rotates in a negative direction relative to the inner member, the rotary member (3) becomes a one-way clutch wherein the planetary gear engages with a corner portion (49) formed in one side in a circumferential direction of the concave portion, and the outer member and the inner member integrally rotate. The inner member includes the insertion hole along a rotational axis line thereof, and the pair of control walls. The respective concave portions are disposed on a side opposing to the insertion hole of the pair of control walls.

According to the configuration, by a heating deformation, the protruding end of the rotor axis protruding outward in the radial direction, and the planetary gear can be disposed in a position overlapped in an axis line direction of the rotor axis so as to be capable of downsizing the one-way clutch. In other words, by disposing the concave portion in a dead space formed by disposing the control wall, without increasing the inner member in size, a space for the protruding end of the rotor axis to protrude outward in the radial direction can be ensured in the inner member.

In another aspect of the present invention, a cross-sectional surface of the insertion hole is formed in a quadrangular shape, and the pair of control walls is provided to stand along an opposite side mutually facing the insertion hole.

According to the configuration, the protruding end of the rotor axis is guided by the pair of control walls at a time of the heating deformation, and protrudes in two directions different by 180° in the radial direction of the rotor axis so as to ensure an engagement state between the rotor axis and the inner member.

In another aspect of the present invention, the rotor axis is formed in a shape which can fit into the insertion hole non-rotatably, and a portion which does not face the control wall is heated and deformed outward in the radial direction.

According to the configuration, the rotor axis fits into the insertion hole, so that the rotor axis and the insertion hole can integrally rotate. Also, the portion which does not face the control wall of the rotor axis is heated and deformed outward in the radial direction so as to retain the rotor axis from the insertion hole, and to minimize a portion for the heat deformation of the rotor axis.

Another aspect of the present invention is a method for manufacturing the rotary damper device (1) comprising the damper housing (11) internally enclosing the viscous fluid; the rotor (12) including the rotor vane (28) rotatably received inside the damper housing, and the rotor axis (29) provided to project along the rotary axis of the rotor vane, and protruding to the outside of the damper housing; and the rotary member combined with the protruding end of the rotor axis. The rotary member includes the insertion hole (43) through which the protruding end of the rotor axis passes; and the pair of control walls (44) provided to stand in the hole edge of the insertion hole in such a way as to be mutually opposed by sandwiching the insertion hole. The method for manufacturing the rotary damper device (1) includes a step of allowing the protruding end of the rotor axis to pass through the insertion hole from a side opposing to a side wherein the control wall is provided to stand; and a step of pressing the protruding end by a heated pressing piece (80), and heating and deforming the protruding end to protrude the protruding end in the radial direction of the rotor axis along the gap between the pair of control walls so as to be engaged with the hole edge of the insertion hole.

According to the configuration, the rotor axis can be easily combined relative to the rotary member.

Effect of the Invention

According to the aforementioned configuration, in the rotary damper device, a combination structure between the rotor axis and the rotary member combined with the rotor axis can be simplified and ensured. Also, the combination structure between the rotor axis and the rotary member can be easily formed.

BEST MODES OF CARRYING OUT THE INVENTION

Figure 1:
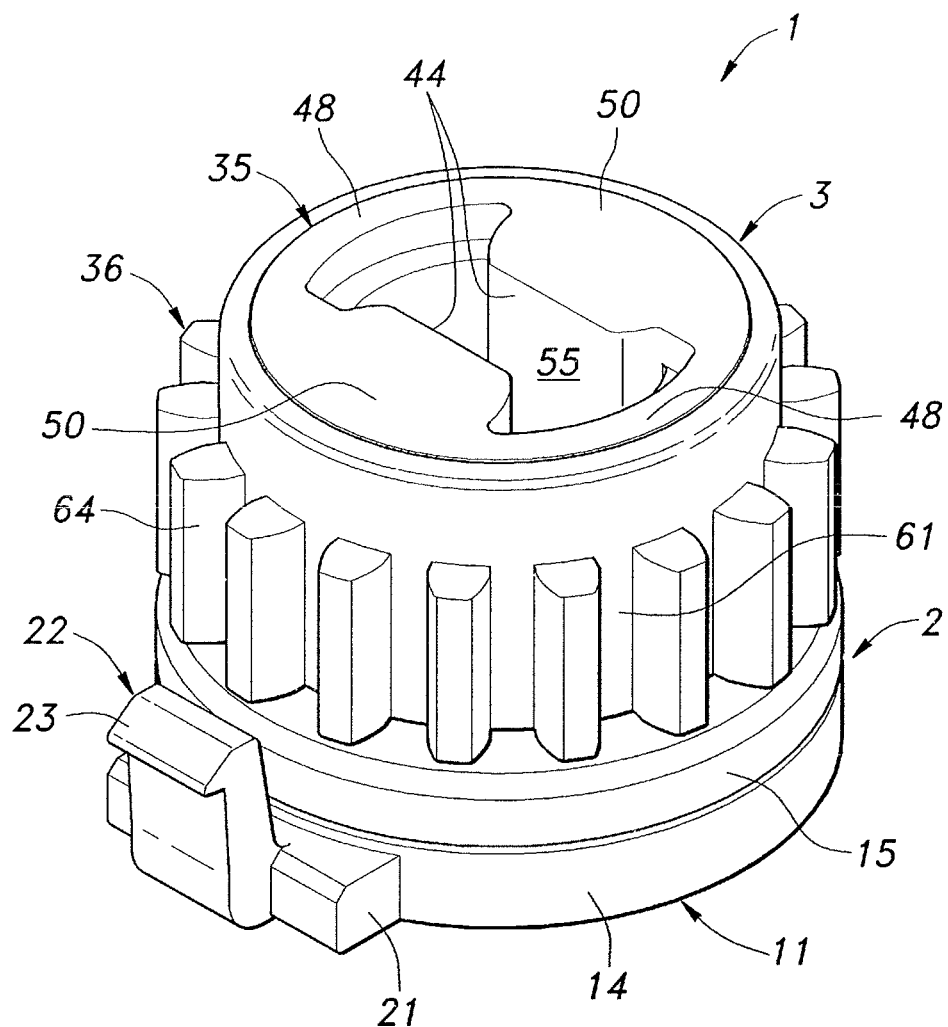
FIG. 1 is a perspective view of a rotary damper device according to an embodiment.
Figure 2:
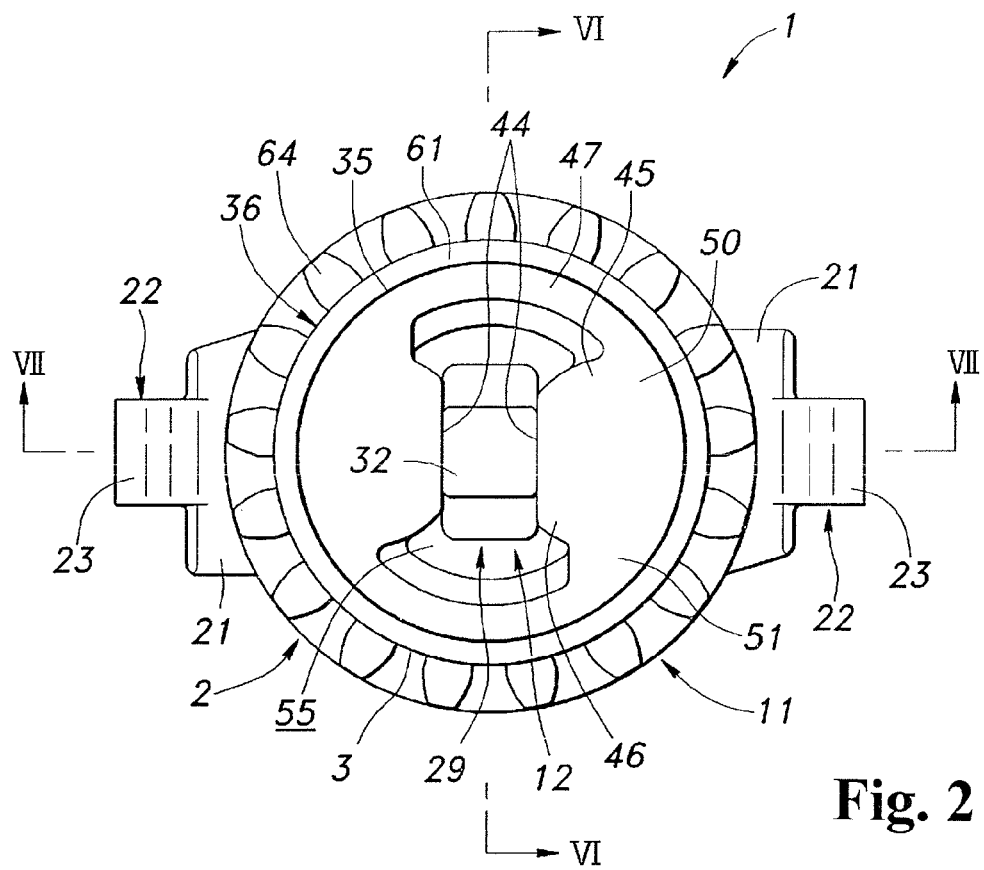
FIG. 2 is a plan view of the rotary damper device according to the embodiment.
Figure 3:
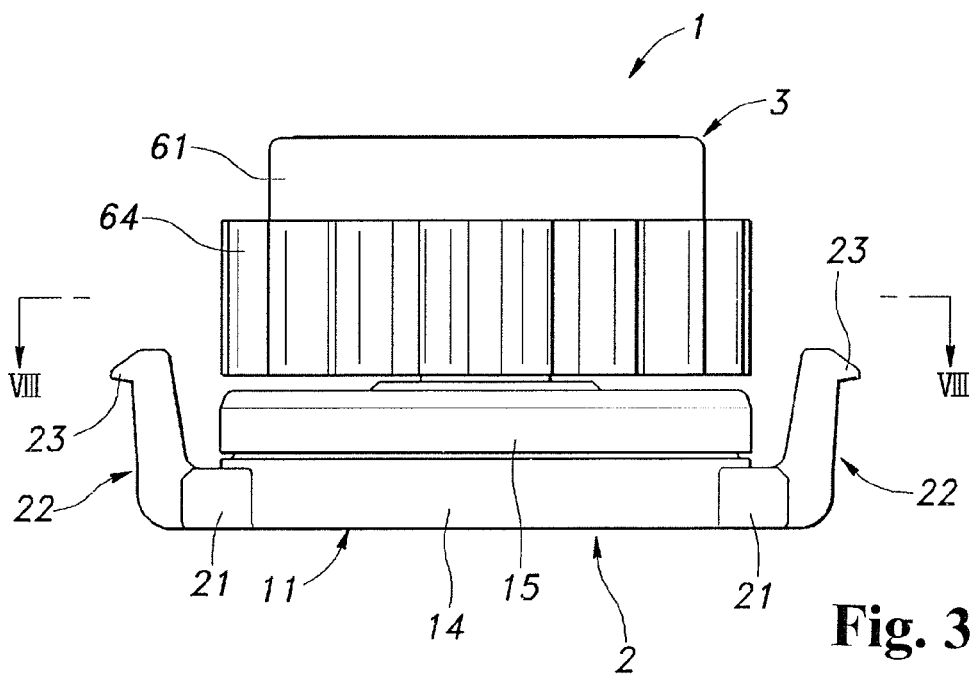
FIG. 3 is a front view of the rotary damper device according to the embodiment.
Figure 4:
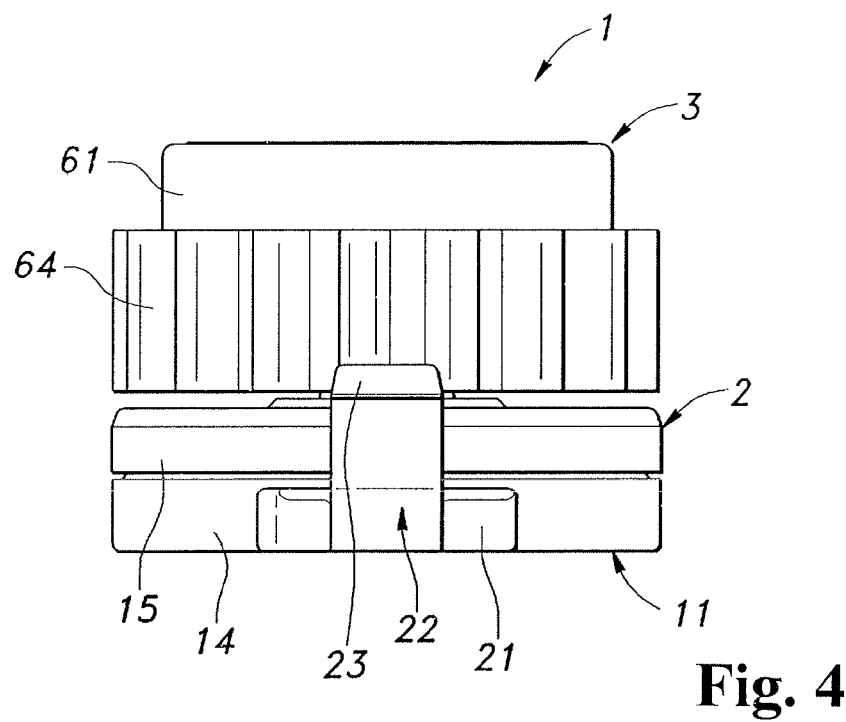
FIG. 4 is a side view of the rotary damper device according to the embodiment.
Figure 5:
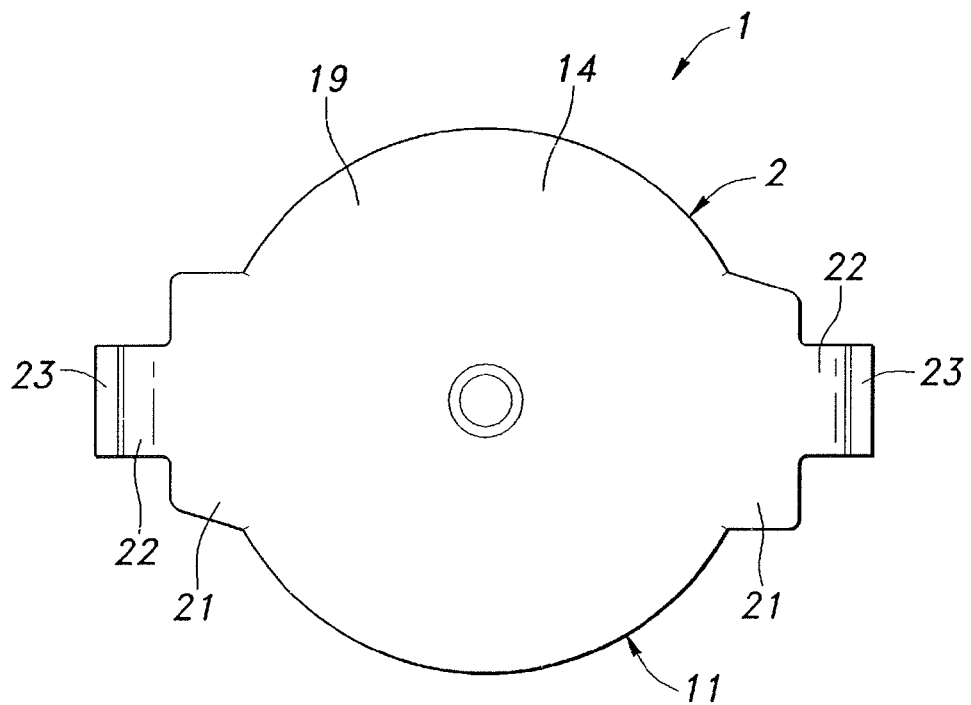
FIG. 5 is a bottom view of the rotary damper device according to the embodiment.

Hereinafter, with reference to drawings, embodiments in which the present invention is applied will be explained in detail. In the following explanation, based on a coordinate axis shown in the drawings, each direction is defined.

As shown in FIG. 1 to FIG. 8, a rotary damper device 1 according to the embodiment is a combination of a rotary damper 2 relative to a one-way clutch 3 as a rotary member.

Figure 6:
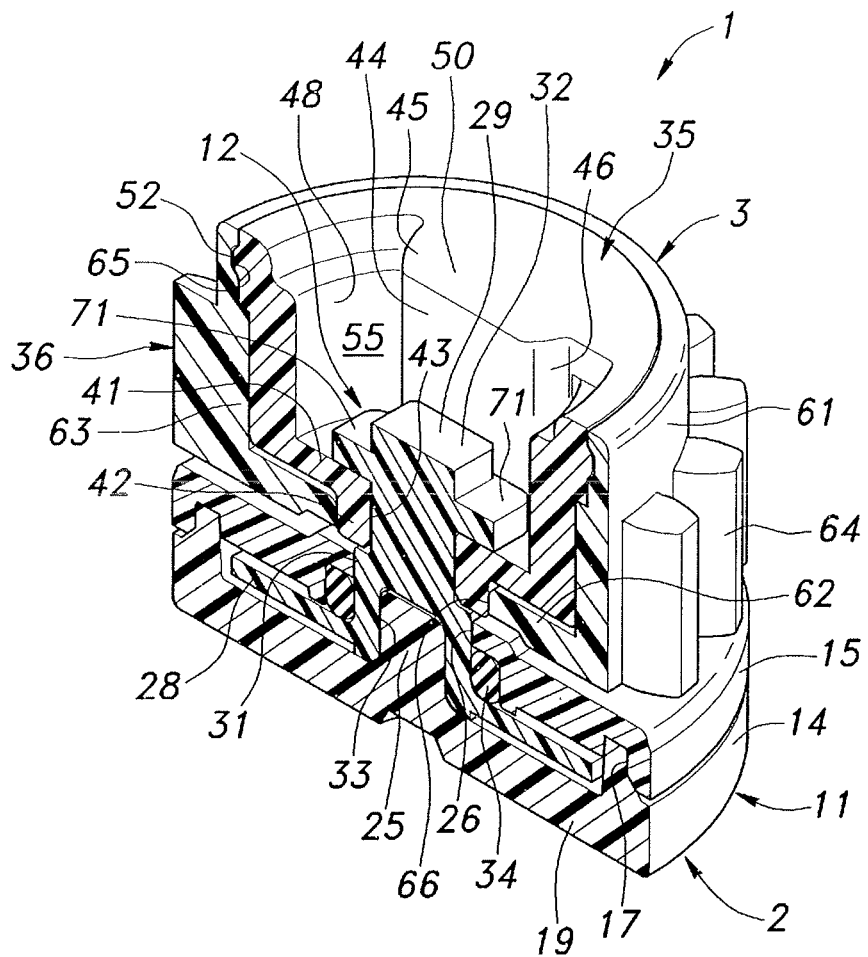
FIG. 6 is a cross-sectional perspective view taken along a line VI-VI in FIG. 2.

As shown in FIG. 6, the rotary damper 2 includes a damper housing 11 internally enclosing a viscous fluid; and a rotor 12 rotatably received inside the damper housing 11. The damper housing 11 includes a cylindrical bottom member 14 with a bottom, and a disk-shaped lid member 15 closing an opening end of the bottom member 14; both are formed by a resin material. In a circumferential edge portion of the lid member 15, there is concaved an annular groove 17 in which the opening end of the bottom member 14 can be fitted. The bottom member and the lid member 15 are mutually combined by friction welding (vibration welding) in a state wherein the opening end of the bottom member 14 is fitted into the annular groove 17.

As shown in FIG. 1, in a bottom part lateral portion on an outer circumferential surface of the bottom member 14, there are provided two jaw portions 21 projected outward in a radial direction at an interval of 180° in a circumferential direction. In a protruding end of each jaw portion 21, there is provided an elastic claw 22 extending to an opening end side of the bottom member 14 parallel to an axis line direction of the bottom member 14. Each elastic claw 22 protrudes outward in the radial direction of the bottom member 14, and includes a claw portion 23 having a non-return surface facing a base end side of the elastic claw 22. By elastically deforming, the elastic claw 22 can incline in the radial direction of the bottom member 14.

As shown in FIG. 6, in a center portion of a bottom portion 19 of the bottom member 14, there is provided a column-shaped axis 25 protruding to a lid member 15 side along an axis line of the bottom member 14. In a center portion of the bottom member 14, there is formed a through-hole 26 which is a circular hole having the same axis as the axis 25.

The rotor 12 includes a disk-shaped rotor vane 28, and a rotor axis 29 provided to project along an axis line to one side from the center of the rotor vane 28. The rotor 12 is formed by a thermoplastic resin, and the rotor vane 28 and the rotor axis 29 are integrated. In the rotor axis 29, a base end portion 31 is formed in a column shape, and an end portion 32 continuing to the base end portion 31 is formed in a quadrangular column shape.

On a side opposing to a side wherein the rotor axis 29 of the rotor vane 28 is provided to project, a bearing hole 33 is provided to be concaved, which is a hole with a bottom whose cross-sectional surface is circular. The rotor vane 28 is received in a space (i.e., an internal space of the damper housing 11) defined by the bottom member 14 and the lid member 15, and is rotatably supported by axes on the axis 25 in the bearing hole 33. At that time, the rotor axis 29 passes through the through-hole 26, and the end portion 32 and one portion of the base end portion 31 protrude to an outside of the damper housing 11. In that state, an outer circumferential surface of the base end portion 31 is opposed to a hole wall of the through-hole 26.

An O-ring 34 having flexibility is installed between the base end portion 31 of the rotor axis 29 and the through-hole 26. The O-ring 34 seals a gap between the rotor axis 29 and the through-hole 26, and prevents the viscous fluid such as, for example, silicone oil, filled in the internal space of the damper housing 11, from flowing out of the through-hole 26.

The rotary damper 2 configured as above provides a rotational resistance (damps a rotation) to the rotor 12 by a flow resistance of the viscous fluid when the rotor 12 rotates relative to the damper housing 11. The rotational resistance of the rotary damper 2 can be adjusted by appropriately changing viscosity of the viscous fluid or a shape of the rotor 12.

Figure 8:
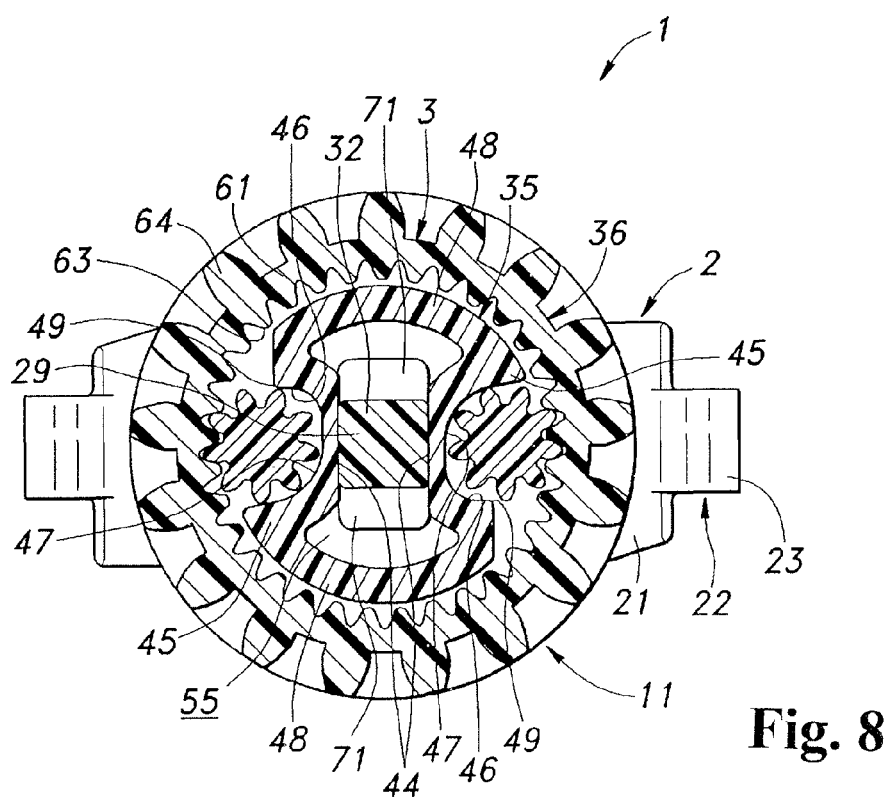
FIG. 8 is a cross-sectional view taken along a line VIII-VIII in FIG. 3.

As shown in FIG. 8, the one-way clutch 3 includes an inner member 35 combined with the rotor axis 29 and rotating integrally with the rotor axis 29; an outer member 36 receiving the inner member 35 to allow a relative rotation; and a pair of planetary gears 37 installed between the inner member 35 and the outer member 36. The inner member 35, the outer member 36, and the planetary gear 37 are respectively formed by a resin material.

The inner member 35 has a tube shape whose one end has a bottom plate 41, and the other end is open. In a center portion of a lower surface of the bottom plate 41, there is provided a column-shaped support axis 42 which becomes the same axis as the bottom plate 41. In a center portion of the bottom plate 41 and the support axis 42, there is formed an insertion hole 43 integrally penetrating along axis lines of the bottom plate 41 and the support axis 42. A cross-sectional surface of the insertion hole 43 has a quadrangular shape.

On an upper surface of the bottom plate 41, there is provided a control wall 44 standing upwardly along a pair of respective opposite sides facing the insertion hole 43. A lateral end of the control wall 44 extends outward from one side of the insertion hole 43. A first wall 45 and a second wall 46 continuing to both lateral ends of each control wall 44 extend outward in a radial direction of the inner member 35. Concave portions 47 opening outward in the radial direction are defined by the control walls 44, the first wall 45, and the second wall 46. Between two concave portions 47, the first wall 45 of one concave portion 47 and the second wall 46 of the other concave portion 47 are connected by an arc wall 48 extending in an arc shape. As mentioned above, the concave portion 47 is formed in a lateral circumferential portion of the inner member 35 at an interval of 180° in the circumferential direction.

As shown in FIG. 8, the first wall 45 and the second wall 46 respectively continue to the control wall 44 smoothly so as to form a lateral surface of the concave portion 47 in a smooth curved surface. The first wall 45 extends up to the top of an arc in which an outer circumferential surface of the arc wall 48 is extrapolated in the radial direction of the inner member 35. On the other hand, the second wall 46 is short such that an extending length in the radial direction of the inner member 35 is approximately half compared to the first wall 45, and the second wall 46 forms a corner portion 49 in an extended end portion.

Figure 7:
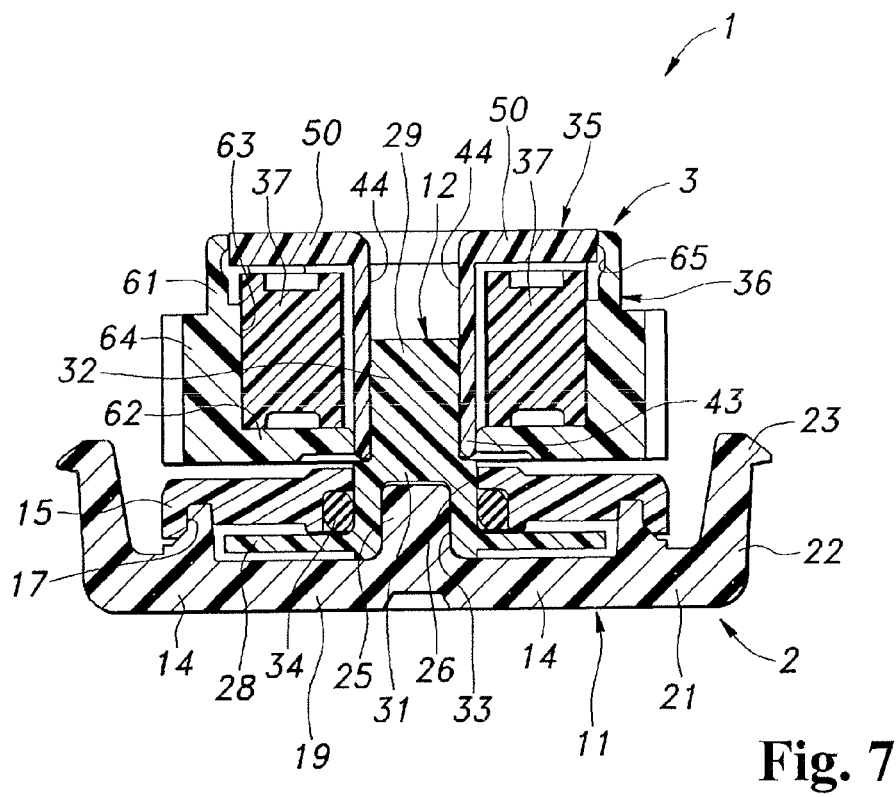
FIG. 7 is a cross-sectional view taken along a line VII-VII in FIG. 2.

As shown in FIG. 7, all upper ends of the control wall 44, the first wall 45, and the second wall 46 are connected by a top wall 50. Namely, an upper end of the concave portion 47 is sealed by the top wall 50. In an outer edge of an upper end of a pair of arc walls 48, there is formed a projecting piece 52 extending along the circumferential direction.

The inner member 35 configured as above includes an internal space 55 opening upwardly and defined by the bottom plate 41, the control wall 44, the first wall 45, the second wall 46, and the arc wall 48 from a different point of sight. The internal space 55 is communicated with the insertion hole 43.

The outer member 36 is a cylindrical member with a bottom composed of a cylindrical lateral circumferential wall 61, and a disk-shaped bottom plate 62 provided in one end of the lateral circumferential wall 61. On an inner circumferential surface of the lateral circumferential wall 61, there is formed an internal gear 63 composed of a plurality of internal teeth, and on an outer circumferential surface, there is formed an external gear 64 composed of a plurality of external teeth. Also, on the inner circumferential surface of an opening end (an end portion different from a side wherein the bottom plate 62 is provided) of the lateral circumferential wall 61, there is formed a locking groove 65 annularly extending along the circumferential direction. In the center of the bottom plate 62, there is formed a through-hole 66 whose cross-sectional surface is circular, and through which the support axis 42 of the inner member 35 can pass while slidingly contacting.

The outer member 36 receives the inner member 35 in a space defined by the lateral circumferential wall 61 and the bottom plate 62. At that time, the support axis 42 of the inner member 35 is inserted and passes through the through-hole 66 of the outer member 36 while slidingly contacting, and the projecting piece 52 fits into the locking groove 65. Since the projecting piece 52 fits to be movable inside the locking groove 65 along an extending direction of the locking groove 65, the outer member 36 is supported relative to the inner member to allow the relative rotation in the circumferential direction while being retained in an axis line direction. At that time, the internal gear 63 of the outer member 36 is configured so as not to contact with the inner member 35.

The pair of planetary gears 37 is respectively a spur gear having a predetermined length in an axis direction, and is received in each concave portion 47 in such a way that an axis line becomes parallel to axis lines of the inner member 35 and the outer member 36. The planetary gear 37 is engaged with the internal gear 63 of the outer member 36 in a state received in the concave portion 47.

In the one-way clutch 3 configured as above, as a standard of a state seen from above as shown in FIG. 8, when the outer member 36 rotates relative to the inner member 35 in a positive direction (counterclockwise), the planetary gear 37, which is rotated by the internal gear 63 of the outer member 36, moves the concave portion 47 to a first wall 45 side. At that time, the planetary gear 37 abuts against the first wall 45, so that a movement in a first wall 45 direction is controlled, and the planetary gear 37 runs idle while slidingly contacting on the first wall 45. The first wall 45 comparatively extends outward in the radial direction of the inner member 35, so that the planetary gear 37 smoothly runs idle on the first wall 45 without being engaged with a border portion between the first wall 45 and the arc wall 48. Therefore, even if the outer member 36 rotates, the inner member 35 does not rotate.

On the other hand, when the outer member 36 rotates relative to the inner member 35 in a negative direction (clockwise), the planetary gear 37, which has been rotated by the internal gear 63 of the outer member 36, moves to a second wall 46 side, and is engaged with the corner portion 49 of the second wall 46 so as to become incapable of rotating. Thereby, the inner member 35 engages with the outer member 36 through the planetary gear 37 so as to rotate integrally with the outer member 36.

As mentioned above, in the one-way clutch 3, when the outer member 36 attempts to carry out the relative rotation in the positive direction relative to the inner member 35, the inner member 35 and the outer member 36 can carry out the relative rotation, and when the outer member 36 attempts to carry out the relative rotation in the negative direction relative to the inner member 35, the inner member 35 and the outer member 36 integrally rotate.

A combination structure between the rotary damper 2 and the one-way clutch 3 configured as above, and a formation method thereof will be explained. At first, the end portion 32 of the rotor axis 29 of the rotary damper 2 is passed through the insertion hole 43 of the inner member 35 of the one-way clutch 3, and is protruded into the internal space 55. Cross-sectional surfaces of both the end portion 32 and the insertion hole 43 are formed in a quadrangular shape, and have a shape which can be fitted into each other, so that the relative rotation around the axis line of the rotor axis 29 is controlled, and the rotor axis 29 and the inner member 35 integrally rotate.

Figure 9:
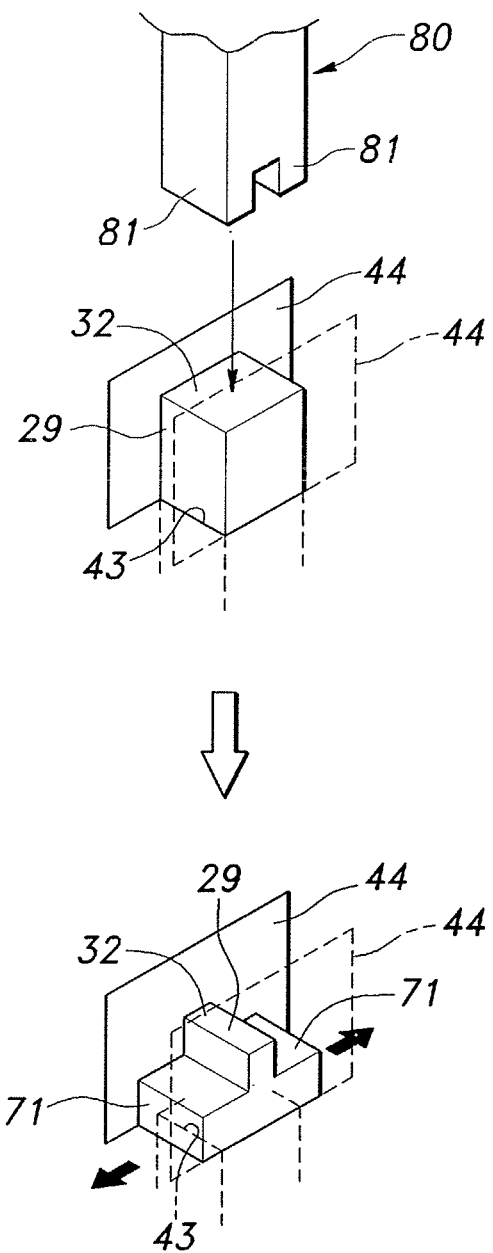
FIG. 9 is a pattern diagram showing a heat deformation process of a rotor axis.

Next, as shown in FIG. 9, using a heated pressing piece 80, the end portion 32 of the rotor axis 29 is deformed. The pressing piece 80 is a metallic rod-shaped member which can fit into the internal space 55 of the inner member 35, and includes a pair of projecting pieces 81 on an end thereof. The pair of projecting pieces 81 is arranged in parallel at a predetermined interval so that opposed sides of the end portion 32 mutually face. After a temperature of the end portion 32 has been risen to a deformable temperature, the pressing piece 80 is disposed such that the pair of projecting pieces 81 faces a pair of opposite sides which does not face the control wall 44 of the end portion 32, and the pressing piece 80 is pressed against the end portion 32 from an axis line direction of the rotor axis 29. Thereby, the end portion 32 is heated and pressed by the projecting piece 81 so as to deform. At that time, since the control walls 44 are present on both sides of the end portion 32, a flexibility-enhanced portion by heating is pressed by the projecting piece 81, and protrudes in a radial direction of the rotor axis 29, and in the directions wherein the control walls 44 are not present so as to form convex portions 71. Namely, the pair of control walls 44 guides a protruding direction of the convex portion 71. Due to the aforementioned formation method, two convex portions 71 are formed outward in the radial direction of the rotor axis 29, and in mutually opposing directions. Each convex portion 71 engages with a circumferential edge portion of the insertion hole 43 so as to prevent the rotor axis 29 from being disengaged from the insertion hole 43. Thereby, the rotary damper 2 and the one-way clutch 3 are combined so as to form the rotary damper device 1.

In the rotary damper device 1 configured as above, in a state wherein the damper housing 11 has been fixed, when the outer member 36 rotates in the positive direction relative to the inner member 35, even if the outer member 36 rotates, the inner member 35 does not rotate, and the rotational resistance (a damping force) by the rotary damper 2 does not occur. However, when the outer member 36 rotates in the negative direction relative to the inner member 35, the inner member 35 and the rotor axis 29 rotate together with the outer member 36, and the rotational resistance (the damping force) by the rotary damper 2 occurs.

In the combination structure between the rotary damper 2 and the one-way clutch 3 of the present embodiment, only mutually opposed opposite side portions of the rotor axis 29 are heated and deformed, so that a pressing force of the pressing piece 80 and a heating amount can be reduced. Also, due to the pair of control walls 44, the protruding direction of the convex portion 71 is controlled in one portion, so that the convex portion 71 can be formed to be thick, and a formation operation of the convex portion 71 is facilitated.

Figure 10:
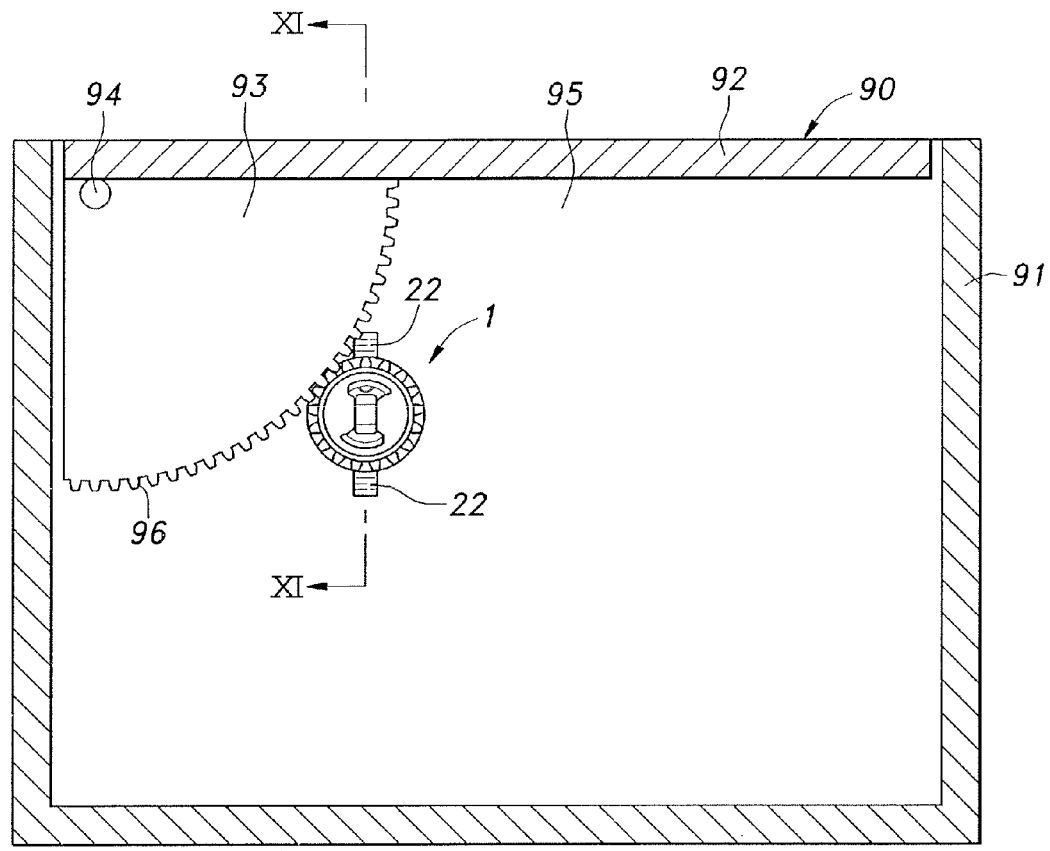
FIG. 10 is a side view showing a box with a lid wherein the rotary damper device according to the embodiment is applied.
Figure 11:
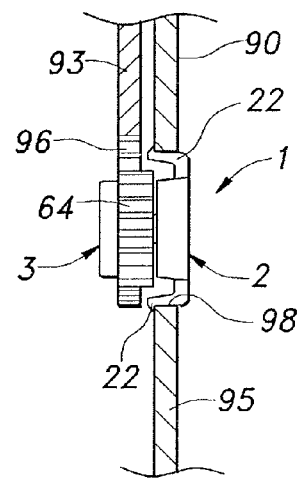
FIG. 11 is a cross-sectional view taken along a line XI-XI in FIG. 10.

As shown in FIG. 10 and FIG. 11, a usage example of the rotary damper device 1 will be explained. The rotary damper device 1 is used for, for example, a box with a lid 90 such as a cup holder and the like. The box with the lid 90 includes a box 91 with an upper opening, and a lid 92 with a flat plate shape which closes the opening of the box 91 openably and closably. The lid 92 includes a fan-shaped ear portion 93 provided to vertically stand relative to a main surface in a lateral side portion thereof, and is rotatably supported in a lateral wall 95 of the box 91 by an axis 94 provided in the ear portion 93. In an arc-like circumferential edge portion of the ear portion 93, there is formed a rack 96. Incidentally, although it is not shown in the figures, in the box with the lid 90, there are provided a lock device for maintaining the opening of the lid 92 in a closed state, and a spring urging the lid 92 to rotate in a direction opening the opening.

The rotary damper device 1 is attached to an attachment hole 98, which is a through-hole, formed in the lateral wall 95 of the box 91. Although they are not shown in the figures, the attachment hole 98 includes a circular main portion, and two notch portions notched outward in a radial direction from a circumferential edge of the main portion. The two notch portions are provided in point symmetric positions as a symmetrical axis of the center of the main portion. The rotary damper device 1 is inserted into the main portion of the attachment hole 98. At that time, the jaw portion 21 is engaged with the circumferential edge of the attachment hole 98, and the elastic claw 22 is engaged with the notch portion of the attachment hole 98, so that the rotary damper device 1 is supported in the attachment hole 98. In that state, the external gear 64 of the outer member 36 of the rotary damper device 1 is engaged with the rack 96.

As mentioned above, in a case wherein the rotary damper device 1 is applied to the box with the lid 90, when the lid 92 opens by receiving an urging force from the spring, the outer member 36 rotates in the negative direction by the rack 96; the inner member 35 and the rotor axis 29 rotate together; and the rotary damper 2 generates the rotational resistance so as to reduce an opening speed of the lid 92. On the other hand, when the lid 92 is closed, the outer member 36 rotates in the positive direction by the rack 96, and the inner member 35 and the rotor axis 29 do not rotate, so that the rotary damper 2 will never generate the rotational resistance.

The explanation of the specific embodiment has been completed here; however, the present invention is not limited to the aforementioned embodiment, and can be widely modified. Especially, although the present embodiment has a configuration in which the one-way clutch 3 is combined with the rotary damper 2, instead of the one-way clutch 3, the rotary member may be a gear, a pulley, or the like. In that case, it is only necessary to provide the insertion hole 43 and the control wall 44 in the rotary member. Also, the shape of the control wall can be appropriately changed, and may be formed in, for example, a C-shape so as to be surrounded leaving one side of the insertion hole 43. Also, for the pressing piece 80, various shapes can be used. Also, in the present embodiment, the end portion 32 of the rotor axis 29 has the quadrangular column shape, and the insertion hole 43 has the quadrangular shape. However, the insertion hole 43 may be an I-shape or an oval shape, and the end portion 32 may be a shape which fits into the insertion hole 43 non-rotatably.

EXPLANATION OF SYMBOLS

1 . . . a rotary damper device, 2 . . . a rotary damper, 3 . . . a one-way clutch, 11 . . . a damper housing, 12 . . . a rotor, 28 . . . a rotor vane, 29 . . . a rotor axis, 31 . . . a base end portion, 32 . . . an end portion, 35 . . . an inner member, 36 . . . an outer member, 37 . . . planetary gears, 43 . . . an insertion hole, 44 . . . control walls, 45 . . . a first wall, 46 . . . a second wall, 47 . . . concave portions, 48 . . . arc walls, 49 . . . corner portions, 50 . . . a top wall, 55 . . . an internal space, 63 . . . an internal gear, 64 . . . an external gear, 71 . . . convex portions, 80 . . . a pressing piece, 81 . . . projecting pieces, 90 . . . a box with a lid, 91 . . . a box, 92 . . . a lid

What is claimed is:

1. A rotary damper device, comprising:
a damper housing internally enclosing a viscous fluid;
a rotor including a rotor vane rotatably received inside the damper housing, and a rotor axis provided to project along a rotary axis of the rotor vane, and protruding to an outside of the damper housing; and
a rotary member combined with a protruding end of the rotor axis,
wherein the rotary member includes an insertion hole through which the protruding end of the rotor axis passes; and a pair of control walls provided to extend upwardly from a hole edge of the insertion hole in such a way as to face each other with the insertion hole therebetween, and
the rotor axis has a shape fitting into the insertion hole non-rotatably, and a protruding end having a first portion contacting the pair of control walls, and a second portion extending perpendicular outwardly to the first portion along a gap between the pair of control walls so as to engage with the hole edge of the insertion hole.

2. A rotary damper device according to claim 1, wherein the rotary member includes a cylindrical outer member including an internal gear; an inner member received in the outer member concentrically and rotatably, and including two concave portions in an outer circumferential portion; and planetary gears rotatably received in the respective concave portions, and engaged with the internal gear,
wherein when the outer member rotates in a positive direction relative to the inner member, the planetary gears rotate inside the concave portions, and the outer member rotates independently from the inner member, and when the outer member rotates in a negative direction relative to the inner member, the rotary member becomes a one-way clutch in which the planetary gears engage with corner portions formed in one side in a circumferential direction of the concave portions so that the outer member and the inner member integrally rotate, and
wherein the inner member includes the insertion hole along a rotational axis line thereof, and the pair of control walls, and the respective concave portions are disposed on a side opposing to the insertion hole of the pair of control walls.

3. A rotary damper device according to claim 1, wherein the insertion hole is formed in a quadrangular shape in a cross section, and the pair of control walls is provided to stand along opposite sides mutually facing the insertion hole.

4. A rotary damper device according to claim 1, wherein the inner member comprises a bottom plate having the insertion hole at a center thereof, and
the second portion is present in a space formed by the bottom plate and the pair of control walls.

5. A rotary damper device according to claim 4, wherein the protruding end of the rotor axis has a convex portion and a pair of concave portions on two sides of the convex portion, and
the pair of concave portions forms the second portion.

6. A rotary damper device according to claim 5, wherein the pair of concave portions extends in a direction parallel to the bottom plate.

7. A rotary damper device according to claim 1, wherein a width of the rotor axis is same as a width between the pair of control walls.

8. A method for manufacturing a rotary damper device, comprising:
a step of preparing
a damper housing internally enclosing a viscous fluid;
a rotor including a rotor vane rotatably received inside the damper housing, and a rotor axis provided to project along a rotary axis of the rotor vane, and protruding to an outside of the damper housing; and
a rotary member combined with a protruding end of the rotor axis,
wherein the rotary member includes an insertion hole through which the protruding end of the rotor axis passes; and a pair of control walls provided to extend upwardly from a hole edge of the insertion hole in such a way as to face each other with the insertion hole therebetween;
a step of allowing the protruding end of the rotor axis to pass through the insertion hole to a side wherein the control wall is provided; and
a step of pressing the protruding end by a heated pressing piece, and heating and deforming the protruding end to fit a first portion of the protruding end between the pair of control walls and to protrude a second portion of the protruding end outwardly along a gap between the pair of control walls so as to engage with the hole edge of the insertion hole non-rotatably.

* * * * *